(12) United States Patent (10) Patent No.: US 6,960,954 B2
Lacour (45) Date of Patent: Nov. 1, 2005

(54) VARIABLE FREQUENCY ELECTRIC SIGNAL GENERATOR, AUTOMATIC CONTROL AND LOW COST COMPUTING MEANS

(75) Inventor: Gilles Lacour, Belley (FR)

(73) Assignee: Delachaux S.A., Gennevilliers (FR)

( * ) Notice: Subject to any disclaimer, the term of this patent is extended or adjusted under 35 U.S.C. 154(b) by 0 days.

(21) Appl. No.: 10/168,429
(22) PCT Filed: Dec. 21, 2000
(86) PCT No.: PCT/FR00/03637
§ 371 (c)(1),
(2), (4) Date: Nov. 21, 2002
(87) PCT Pub. No.: WO01/48905
PCT Pub. Date: Jul. 5, 2001

(65) Prior Publication Data
US 2003/0133316 A1 Jul. 17, 2003

(30) Foreign Application Priority Data
Dec. 23, 1999 (FR) .......................... 99 16427

(51) Int. Cl.[7] .............................. H03K 17/56
(52) U.S. Cl. ...................... 327/419; 318/798
(58) Field of Search ................. 327/172–176, 327/387–389, 419, 518; 318/798–802; 361/93.1, 93.2

(56) References Cited

U.S. PATENT DOCUMENTS

| | | | |
|---|---|---|---|
| 4,641,246 A | * 2/1987 | Halbert et al. | ............... 341/163 |
| 4,875,000 A | * 10/1989 | Fry et al. | .................... 318/798 |
| 5,189,589 A | * 2/1993 | Marschall | .................. 361/93.2 |
| 5,254,926 A | * 10/1993 | Miller et al. | ................. 318/798 |
| 5,341,286 A | * 8/1994 | Inoue et al. | .................. 363/98 |

* cited by examiner

Primary Examiner—Minh Nguyen
(74) Attorney, Agent, or Firm—Morgan & Finnegan, LLP (57) ABSTRACT

The invention concerns a signal generator comprising a reference signal generator consisting of a microcontroller, a chopping switch, a sensor for sampling, and a comparator for delivering a value based on the difference between a sample signal and a reference signal. The signal generator also is configured to control the chopping switch and designed to deliver to the switch control level(s) which is/are based on the result(s) of said comparison. The invention is characterized in that the microcontroller comprises one or more input(s) receiving the result(s) of the comparison(s), and one or more output(s) through which the microcontroller is configured to deliver control level(s) to the chopping switches. Also, the microcomputer is programmed to update at predetermined times the control level(s) delivered on the basis of the received comparison result(s).

28 Claims, 10 Drawing Sheets

FIG. 2

FIG_4

FIG_5

FIG_9

FIG_10

FIG_11

FIG_12

FIG.13

VARIABLE FREQUENCY ELECTRIC SIGNAL GENERATOR, AUTOMATIC CONTROL AND LOW COST COMPUTING MEANS

BACKGROUND OF THE INVENTION

The invention relates to electrical signal generators which operate by chopping a DC voltage.

FILED OF THE INVENTION

The generation of an electric signal by chopping a DC voltage is well known under the term pulse width modulation. The frequency is generally fixed but it may be variable in devices such as frequency converters. To generate the control signals for the chopping device, usually IGBT transistors, there are three main methods.

In the first, the pulse widths are placed in tables which are read by a computer. This method is fast to execute but inflexible it requires considerable memory spaces since one table is necessary for each combination of amplitude of the signal and of frequency. This method was used in the earliest frequency converters which were not able to benefit from powerful computers.

According to a second method, a purpose-built component fashions the chopping signals on the basis of the intersection of the signal to be produced and of a sawtooth signal. This method is commonly used for simple frequency converters. It has two limits. The function to be generated must remain simple. Automatic controls for improving the performance are external and difficult to produce.

In a third method, a powerful computer determines the pulse widths on the basis of a more or less complex algorithm. Correction factors are introduced based on measurements of the signals to be generated after a not always obvious mathematical processing. The regulating of the signals with regard to a quantity requires heavy mathematical processing. This efficacious method calls upon components which, necessarily being fast, are expensive. It is used in today's biggest frequency converters.

SUMMARY OF INVENTION

The present invention aims to propose an electrical signal generator operating by chopping a DC voltage, for example a frequency converter, which is inexpensive while nevertheless being sufficiently powerful.

This aim is achieved according to the invention by virtue of a signal generator comprising a generator of at least one reference signal consisting of a logic computer, at least one chopping switch, at least one sensor for extracting at least one signal generated in response to the switchings of said at least one switch, at least one comparator for delivering a value depending on the difference between said at least one extracted signal and said at least one reference signal, and a means of control of said at least one switch designed to deliver on said at least one switch one or more control levels which is or are dependent on the result or results of this comparison or these comparison(s), characterized in that the logic computer comprises one or more inputs receiving the result or results of the comparison or comparisons, and one or more outputs via which the computer delivers one or more control levels to the switch(es), and in that the logic computer is programmed so as to update at predetermined instants the control level(s) delivered as a function of the comparison result(s) received.

Other characteristics, aims and advantages of the invention will become apparent on reading the description which follows, given with reference to the appended figures in which:

DETAILED DESCRIPTION OF THE DRAWINGS

Figure 1:
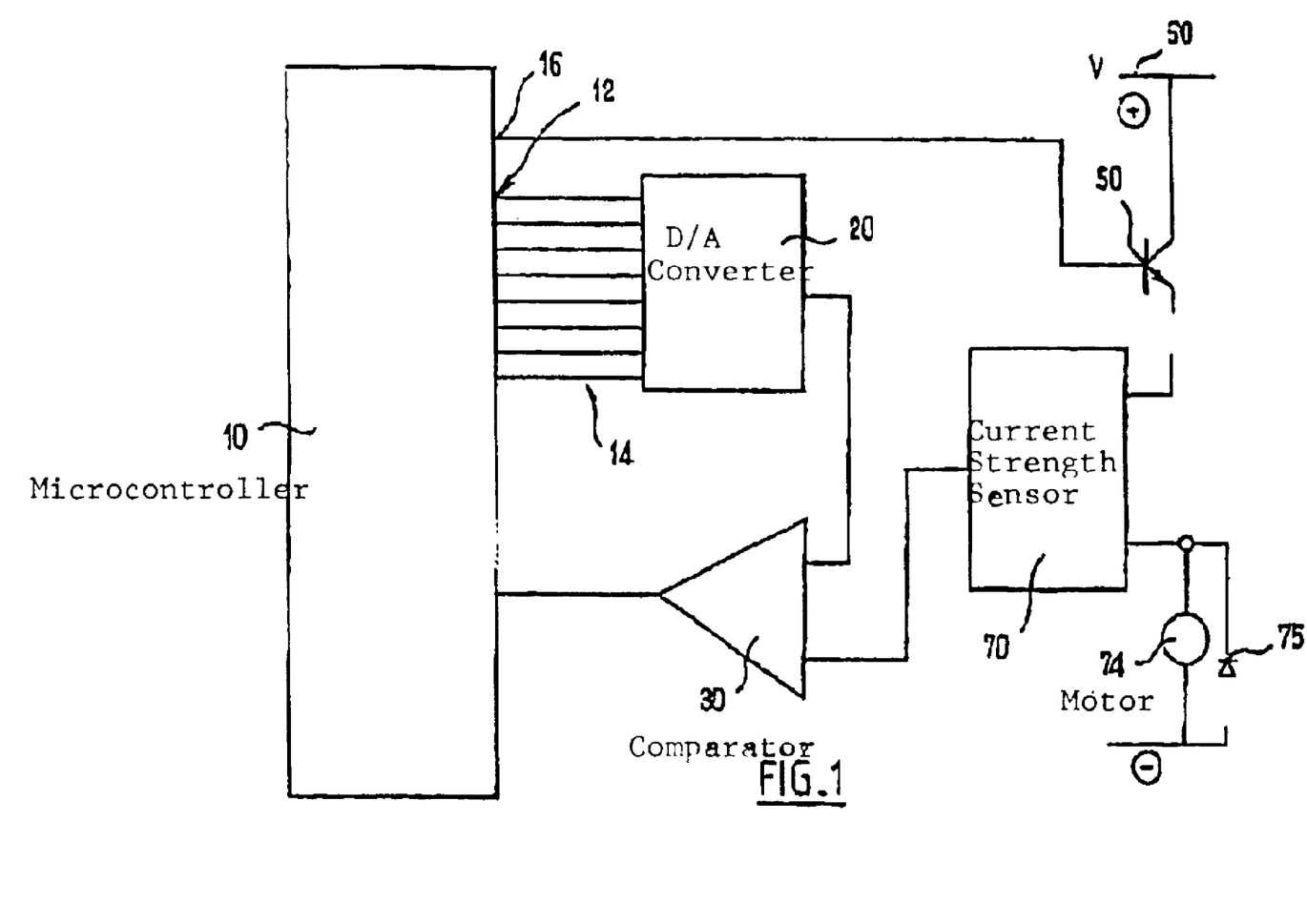
FIG. 1 represents a first circuit in accordance with the invention.

The supply circuit of FIG. 1 includes a microcontroller 10, an output 12 of which delivers, by way of a bus 14, a digital signal hereinafter referred to as the reference signal.

This output 12 transmits this signal to a digital/analog converter 20, which converts it into an analog signal and transmits it to an analog comparator 30.

This comparator 30 receives, on a second input, a signal extracted from a load at the output of the present supply circuit.

The comparator 30, having its output linked to the microcontroller 10, has the role of indicating to the latter the sign of the difference between the extracted signal and the reference signal.

The microcontroller 10 furthermore exhibits a control output 16 linked to the control terminal of a transistor 50, placed between a DC current source 60 and the positive terminal of an inductive load 74, here an inductive loop for detecting metal objects.

This load can also, as will be described hereinbelow, be an inductive loop intended to apply a variable magnetic field to a device of the type having contactless supply.

Placed here, in parallel with the load 74, is a free wheel diode 75 which allows the positive terminal of the load to revert back to earth when the supply voltage in at the low level.

Placed between the transistor 50 and the load 74 is a current strength sensor 70, an output of which provides the previously mentioned extracted signal, conveyed to an input of the comparator 30.

The microcontroller 10 controls a chopping of the DC voltage with the aim of reproducing on the load 74 an electrical signal of chosen shape, itself carrying out the following two functions:
- deducing from the difference between the extracted and reference signals the control to be applied to the chopping switch 50;
- generating the reference signal which must be received on the load 74.

In the present case, the signal extracted at the level of the load 74 is the current through the latter. The microcontroller 10 therefore modifies, by control of the switch 50, the instantaneous voltage in the load 74 so as to obtain equality between the desired instantaneous current and that extracted from the load.

More precisely, the microcontroller 10 applies a simple processing to the switch 50, consisting in closing it when the extracted current strength is below that desired, and in opening it when the extracted current strength is greater than the reference current strength.

The switchings of the transistor 50 are therefore performed only when necessary. The chopped signal therefore varies both in frequency and in duty ratio.

Figure 2:
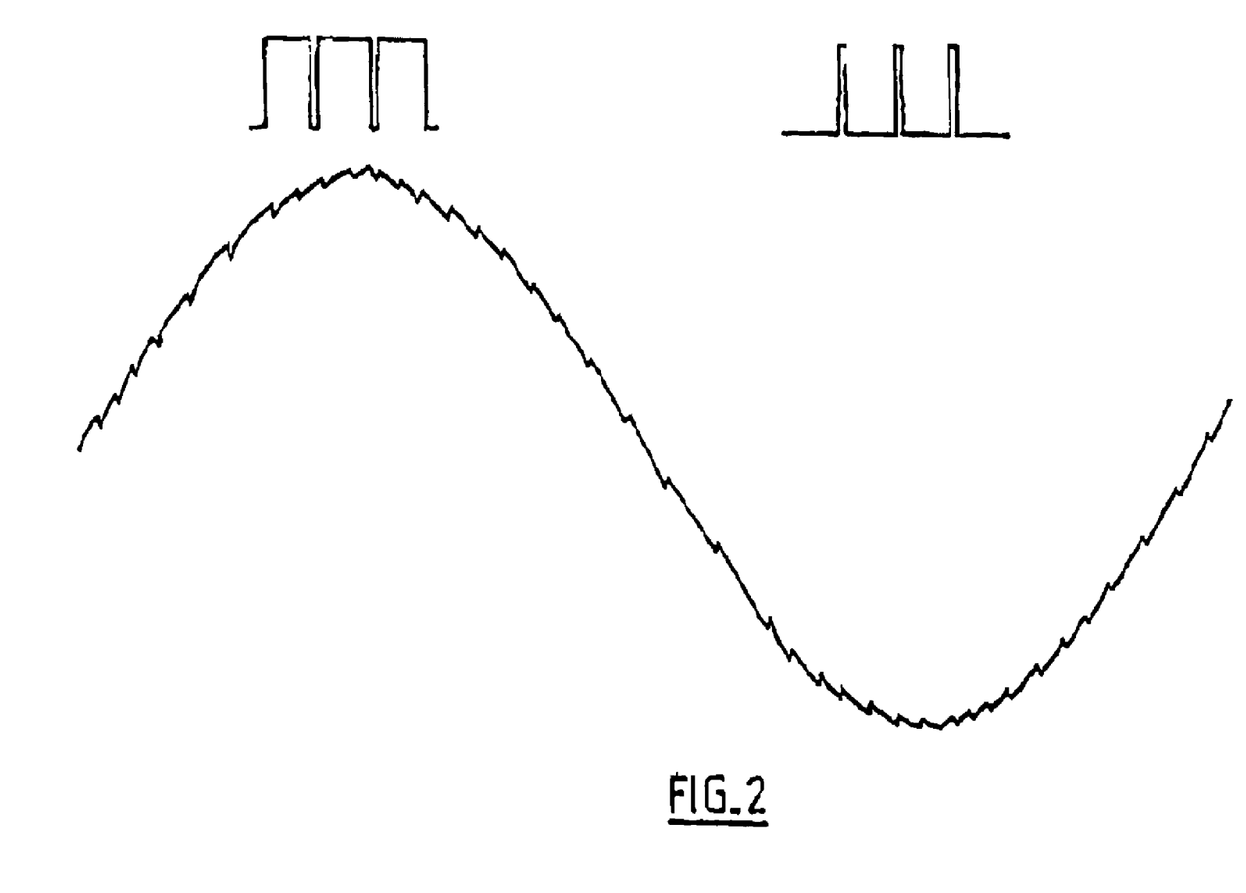
FIG. 2 is a plot representing a curve at current strength obtained in a load placed at the output of the circuit of FIG. 1.

As represented in FIG. 2, the reference signal being a sinusoid, the switchings of the transistor 50 are less frequent in the parts with a steep slope than in the parts with a shallow slope. Specifically, in the parts with a steep slope, it often happens that the switch adopts one and the same closed position for several consecutive updates of its state by the microcontroller 10, this not being the case in the parts with a shallow slope, where the microcontroller tends to make the switch 50 oscillate more strongly between its open and closed positions.

Because the comparator 30 provides the microcontroller 10 with a comparison result continuously in the form of a result signal, (in particular since this comparison is made with regard to analog signals), the microcontroller 10 itself determines the instants at which it extracts a value of this result signal.

These instants are chosen so as to obtain sufficiently fast switching for fine updating of the equality between the two signals, reference and actual, without overstepping the limit switching speed of the switch 50, and as a function of the speed which can be implemented by the microcontroller 10.

In the curve of FIG. 2, that is to say the profile of the current strength in the load 74, the shape of the chopped voltage signal transmitted to the load 74 has also been indicated in correspondence with certain locations on this curve.

At the maxima of the sinusoid, the phase shift due to the inductance of the load 74 remaining fairly small, the mean voltage across the terminals of the latter is also almost at its maximum, hence the chopped voltage exhibits a duty ratio greatly favoring the high notches.

Conversely, at the current strength minima, the chopped voltage exhibits longer low notches than high notches.

Figure 3:
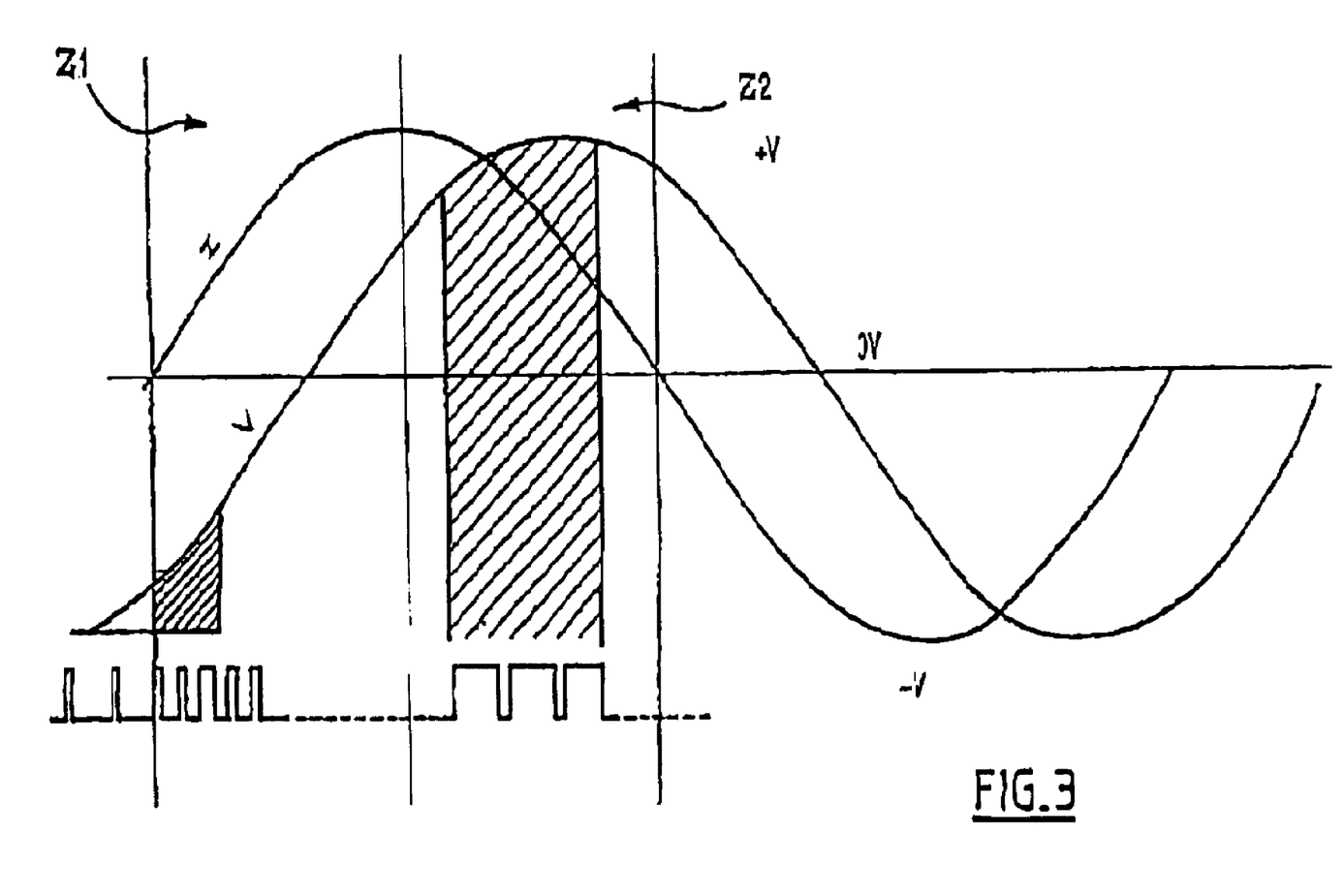
FIG. 3 is a plot representing the time profile of the voltage and of the current strength in this same load, as well as the shape of a chopped voltage input to the load by the circuit of FIG. 1.

Represented in FIG. 3 is the profile of the current strength and of the voltage on the load 74 as a function of the same time axis, accentuating the phase shift between these two curves.

The curve of current corresponds substantially to the reference curve on account of the automatic current control.

In this figure are delimited two zones Z1 and Z2 with reference to the shape of the current curve. The first zone Z1 corresponds to the first quarter, rising, of the current strength sinusoid, and the second zone, Σ2, to the second quarter, falling from the maximum to the zero point, of this same current strength sinusoid.

The microcontroller 10 is programmed to perform a particular counting in each of these two zones Z1 and Z2.

Thus, inside each zone, the microcontroller 10 examines, at predetermined instants regularly spaced in this zone, here every 27 microseconds, whether the switch 50 is in its closed or open state, in other words whether the supply voltage is at its high or low level.

The microcontroller carrying out here an update of the state of the switch 50 at regular intervals, this examination may be undertaken at these update instants.

The identification of the state of the switch 50 is undertaken here by the microcontroller 10 on the basis of the signal received from the comparator 30, this being made possible by the fact that the next update of the switch 50 is correlated directly with the instantaneous result of the comparison at this instant.

The microcontroller 10 therefore counts the number of times that it has identified a passing state of the switch 50 at the examination instants regularly spaced in each zone Z1 and Z2, this representing substantially the average duty ratio over each of these zones.

It is furthermore programmed to compare these two counting values. From this comparison it deduces the phase shift between the voltage and the current strength in the load.

Specifically, the number obtained for each zone Z1 and Z2 is an indication of the value of the voltage in the zone. This zone being indexed with regard to the shape of the current strength curve, a measure of the phase shift between the two curves is established through these countings.

If the curves of voltage and of current strength were perfectly in phase, it is understood that the counts in Z1 and Z2 would correspond respectively to the same shape of curve, symmetric and of opposite slope. The countdowns would then be of the same type.

Conversely, the higher the phase shift between the two curves becomes, the more different will be the shapes of the voltage curves corresponding to the zones Z1 and Z2 of the current strength curve, not example one reaching negative values while the other remaining well above zero.

Thus, the higher the phase shift becomes, the more different will be the countdowns carried out with regard to the voltage curves in Z1 and Z2.

The microcontroller here performs a calculation of the ratio of these two countdowns for the determination of the phase shift.

This determination of the phase shift is used here for the detection of metal objects in front of the coil 70. Specifically, the presence of a metal object will modify the inductance across the terminals of the coil 74 and consequently modify the measured phase shift.

More precisely, the phase shift depends on the type of metal object, in particular on the type of metal and on the shape of the object. There is provision to make, with the aid of the microcontroller 10 or of an external device linked to the microcontroller 10, a search in a stored table giving the type of object as a function of the measured phase shift.

This phase shift can take the form of a brief distortion of the voltage curve, which the microcontroller 10 identifies and distinguishes from other distortions in the same way, by a countdown of states of the switches 50 at predetermined instants, over a limited zone based on the shape of the current strength curve.

To do this, countdown zones matched to the distortion specific to the object or to the material expected are adopted.

Thus, if one wishes to detect aluminum, it is known that the presence thereof in front of the loop 74 will cause a distortion mainly in a zone of the voltage curve corresponding to the first sixth of the current strength curve, and that is where a countdown zone is placed. The choice of the zone, in terms of width and position on the current strength curve, will therefore advantageously depend on the metal to be detected.

The present device automatically controls the loop in terms of current strength and detects voltage distortions but it is also possible to automatically control the loop in terms of voltage and to detect current strength distortions. More generally, the invention is not limited to automatic controls in terms of current strength.

The microcontroller 10 is designed here to generate a sinusoid whose frequency is chosen by transmitting a digital value representative of the desired frequency to the microcontroller 10, on an input (not represented) of the latter.

The microcontroller 10 here exhibits a memory in which is stored a series of points constituting a semisinusoid, which hereinafter will be dubbed the starting semisinusoid.

On the basis of this series of points, here 252 points, that is to say 252 values stored consecutively in the memory, and on the basis of the input value representative of the frequency, the microcontroller 10 reconstructs a sinusoid at the desired frequency, that is to say the reference curve, according to the following process: the microcontroller 10 is programmed to generate, every 12 microseconds, a value read from the series of values of the starting semisinusoid.

However, it is envisaged that it should not pass to the next value of the reference semisinusoid until a particular one of its bits is activated at the instant at which it has to generate a value. Failing activation of this particular bit, the microcontroller resends the value previously sent, without passing to the next value of the series.

The activation of this bit is implemented when a counter of the microcontroller, coded on 8 bits, overshoots the value 256.

Passage to the next value of the series in memory is therefore carried out mechanically in the microcontroller 10 by detecting the change of state of a particular bit of a series of bits, of identifiable number, which are reserved for the storage of a counter value.

In accordance with the present process, the value of the counter is furthermore incremented at each cycle of the microcontroller 10, that is to say every 17 microseconds here, by an increment which is equal to the value given at the input of the microcontroller 10 as an indication of the frequency of the reference signal to be delivered, that is to say here of the current strength to be delivered.

For example, if this input value is equal to 87, the counter, for example initially at zero, passes at the next cycles to 87 (the microcontroller 10 then delivers on its output 12 the same value of the semisinusoid as that sent at the previous cycle), then it passes to 174 (still the same value on the output 12), then it passes to 174+87=261, that is to say 256+5, i.e. 5 in modulo 256 storage (on 8 bits): the counter has then overstepped the value 256, its special bit has been activated, and the microcontroller 10 then reads the next value of the semisinusoid.

Once the semisinusoid has been completely read, a curve part indicator bit indicates that it is now necessary to read the semisinusoid while applying a negative sign thereto.

Thus, the microcontroller delivers the same value several times on the output 12, and does not pass to the next value until the counter has reached its maximum value. The counter being incremented at each cycle by a chosen increment, the higher this chosen incrementation value, the more frequent will be the attaining of the maximum value.

Figure 4:
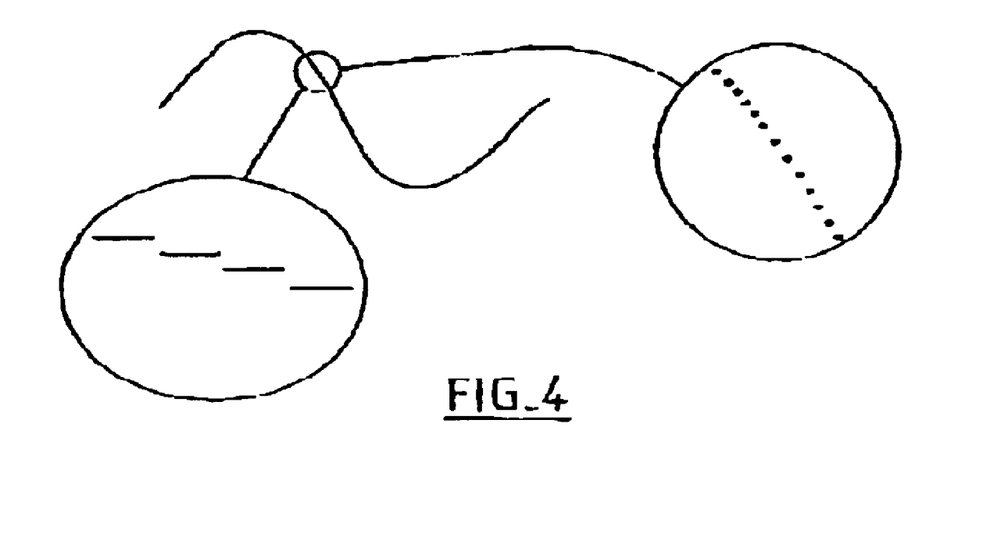
FIG. 4 is a plot representing the shape of a reference curve provided by a microcontroller of the circuit of FIG. 1 as a function of a frequency chosen for this reference curve.

Thus, as represented in FIG. 4, the reference sinusoid consists of a series of porches whose ordinate is that of a point of the reference semisinusoid, and whose length corresponds to the number of times this point is repeated, this number of repetitions being all the higher the smaller the value indicative of the frequency.

Hence, the smaller the value indicative of frequency, the more the microcontroller 10 extends the length of the porches, the frequency of the reference curve then being all the larger the larger the value indicative of frequency.

This process is implemented in the microcontroller 10 with a particularly small number of instructions. It implements a variation of frequency with a number of calculations and a memory which is very small.

It will be noted that if the value of the chosen increment is high, for example 250, it is possible for the microcontroller to repeat just one or two points over a sinusoid: the latter is therefore extended in duration by a distortion localized at this point. However, a localized distortion such as this turns out not to have harmful consequences with regard to the behavior of the load in most applications, but nevertheless affords fine implementation of the desired frequency.

It will be noted that if the chosen increment is sufficiently high, the microcontroller 10 changes read value, in the starting semisinusoid, practically at each incrementation.

A reference curve such as that of FIG. 4 on the right is then obtained, exhibiting practically no porch.

The present process therefore requires, for its implementation, only a simple microcontroller, that is to say a clock, a counter operating on a few bits, a memory in which is stored tho increment to be applied to the counter at each clock cycle, a table comprising a certain number of reference points, and a reader of this memory which is designed to change point in the table with each change of state of a given bit of the counter.

Each of these elements is especially simple and is found in most of the cheapest contemporary microcontrollers.

Figure 6:
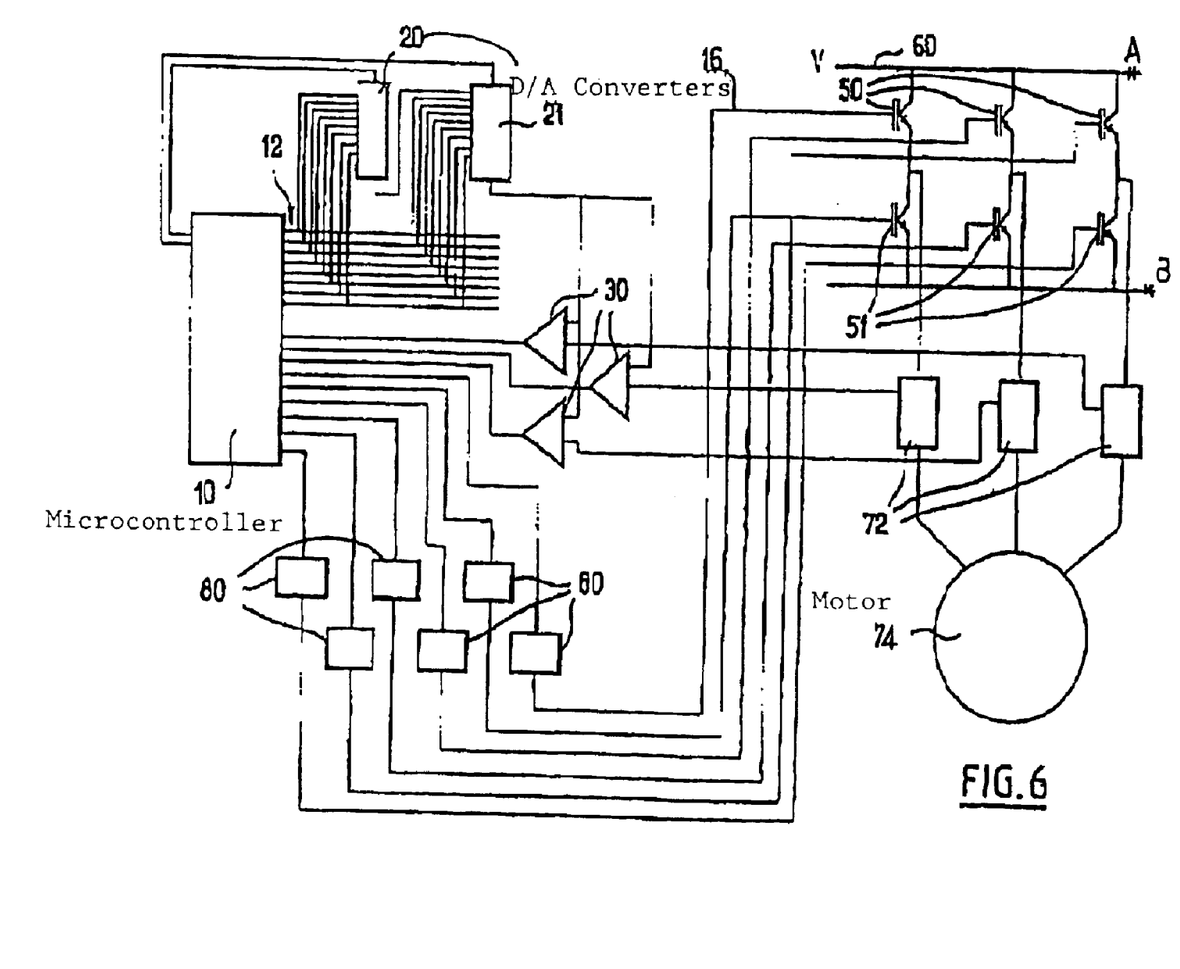
FIG. 6 represents a second circuit according to the invention, with three-phase supply.

A supply circuit for three-phase electric motor 74 has been represented in FIG. 6.

This circuit reuses the essential elements of the previous circuit, in a layout suited to a three-phase supply on three branches, each branch being automatically controlled in terms of current on the basis of a reference signal from among three mutually phase-shifted periodic signals.

Thus, the present circuit comprises three branches each furnished with two transistors 50 and 51 in series between a DC line at the voltage v and earth, and the three terminals of the motor 74 are connected on each occasion between the two transistors 50 of one of the three branches.

The present supply circuit actually comprises on each switching branch a second transistor 51 placed between a point of connection to the load 74 and earth, and also controlled by the microcontroller 10, in such a way that it exhibits the opposite state to that of the switch 50 of the same branch.

The switchings of two transistors 50 and 51 of one and the same branch are nearly synchronized, while complying nevertheless with an idle time between the corresponding switchings, during which idle time the two transistors 50 and 51 are both off, so as to prevent a short circuit between the DC current line and earth.

Each branch has its two switches 50 and 51 controlled by the microcontroller 10 as a function of a difference between a reference signal and a signal measured on the motor and corresponding to one of the phases. For each of the three branches, the result of this comparison is made by one out of three analog comparators 30, the comparator in question corresponding to this branch.

Thus, the circuit exhibits three comparators 30, each receiving on its two inputs a multiplexed reference signal generated by the microcontroller 10 and corresponding to the concatenation of pieces of three reference signals, corresponding respectively to the three branches, and a signal extracted from a phase of the motor 74 by way of a current sensor 72 placed in series with the corresponding terminal of this phase.

These three comparators 30 each provide a result indicating the sign of the difference between the two compared signals.

Depending on the results read regularly by the microcontroller 10, the latter controls, in the same manner as described previously, the switches 50, 51 of each of the branches, taking care with regard to compliance with the idle time mentioned previously.

The present microcontroller 10 has its output 12 connected by a databus to two digital/analog converters 20 and 21 each of which carries out a particular processing.

The present microcontroller provides on its output 12 a variable-frequency sinusoid, according to the advantageous process described previously.

It also provides on the converter 20 a digital value representing a factor to be applied to the amplitude of this reference sinusoid before transmitting it to the comparators 30.

The converter 21 receives from the microcontroller 10 the sinusoid to which it applies this amplitude factor.

The converter 21 furthermore carries out a particular multiplexing of this reference sinusoid.

Figure 7:
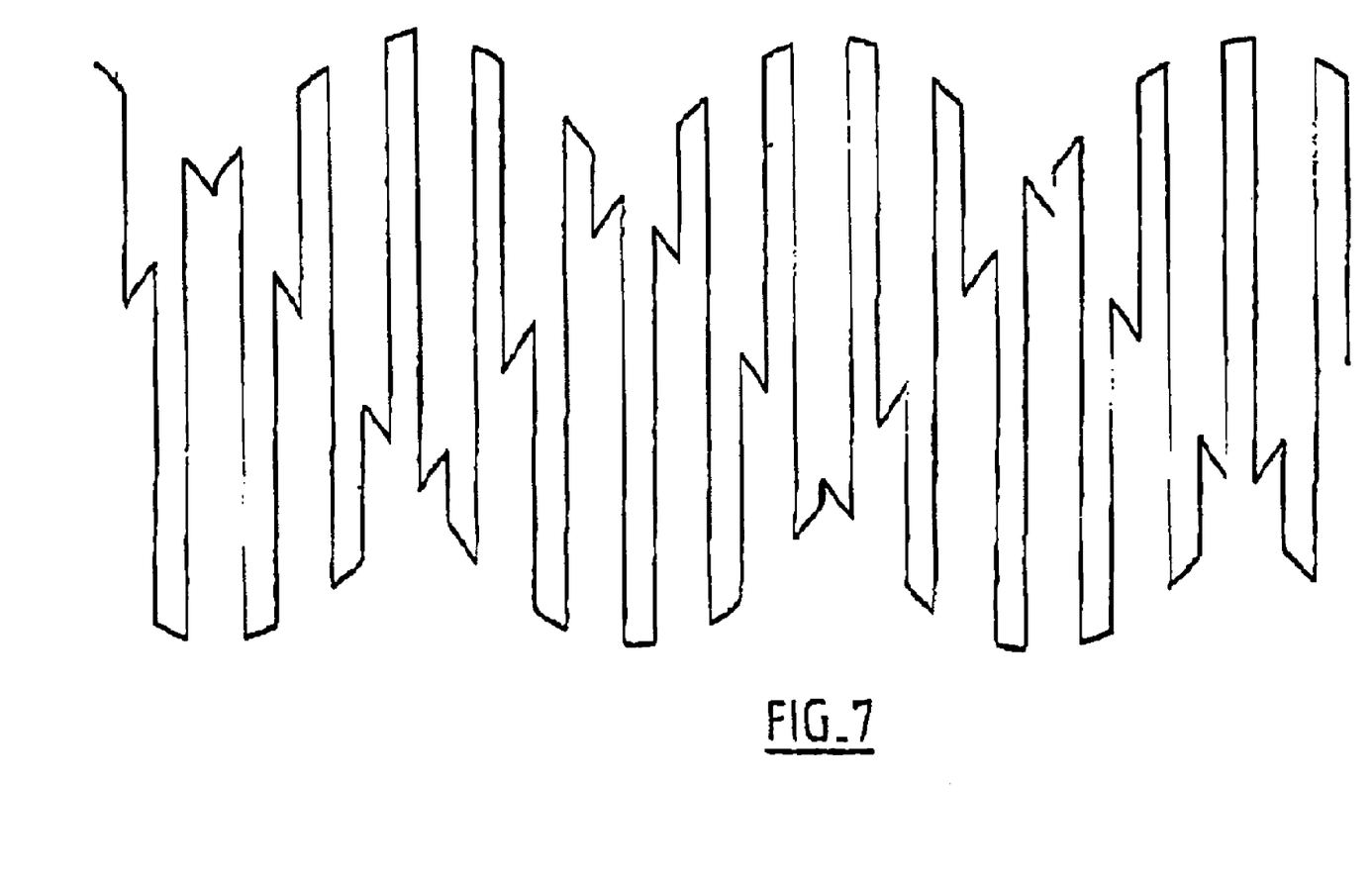
FIG. 7 represents a curve transmitted by a digital/analog converter of the circuit of FIG. 6 to three comparators of this same circuit.

Thus, on the basis of the latter, it provides a signal such as that represented in FIG. 7, consisting of a series of pieces of signals extracted alternately from three signals identical to the reference curve, but mutually offset by 120 degrees.

Thus, the signal output from the convertor 21 is decomposed into time intervals, each consisting of a piece of signal borrowed alternately from each of the three signals at the relevant instant.

Between two intervals where the output curve reproduces one and the same of the three reference sinusoids, the output curve reproduces the other two curves.

Between these two intervals where the output curve reproduces one and the same of the three sinusoids, this same sinusoid has progressed by a duration corresponding to the displaying of the pieces of the other two sinusoids. The output curve therefore picks up this third sinusoid again at the point or it is at. The output signal from the converter 21 therefore exhibits the form of three interleaved sinusoids, joined together at each end of interval, by a vertical segment.

The same output curve is transmitted continuously to each of the comparators 30, so that each comparator 30 outputs a jerky result, since it compares the extracted signal with each of the three sinusoids successively and alternately.

The microcontroller 10 is programmed so that it extracts the result from a given comparator only at the moment at which the latter compares the signal extracted from its branch with the right sinusoid out of the three, that corresponding to this branch, Such synchronization of the extracting as a function of the relevant interval of the signal received is easily implemented in the microcontroller 10 on account of the fact that it is the latter which gives the converter 21 the order to change reference signal to be output, and also determines the instant of the extracting.

The microcontroller 10 extracts from each comparator 30 only the result of the comparison with the right sinusoid, that which one wishes to encounter on the phase of the motor corresponding to this comparator, that of the branch of which the microcontroller 10 controls the switches 50 and 51 as a function of the relevant comparison.

One therefore benefits from simple multiplexing, and from a comparison at each switching so as to verify that the latter is indeed necessary, while implementing efficacious multiplexing with simple and inexpensive computing means.

In the prior art, circuits have been proposed for generating a sinusoidal current strength from a chopped voltage which oscillates between a high level at a voltage V and a low level at zero voltage.

The value of the average voltage in the load (which smoothes the signal) then depends directly on the duty ratio of the voltage at the relevant instant. Thus, a voltage equal to V/2 is obtained for an equal duration of the high notches and of the low notches of the chopped voltage, and greater or less than V/2 depending on whether the high notches or the low notches are longer.

A signal which is periodic about the mean value V/2 is therefore typically obtained. The signal amplitude obtained, which one would like to reach V/2, remains limited by the fact that the load is connected via one of its terminals between two switches, the one linked to the source at the voltage V, and the other to earth, and that the synchronized switchings of these two switches are mutually offset by an idle time aimed at preventing a short circuit between the source at V and earth.

In the present device in which the chopping is automatically controlled with regard to the current strength and in which the switchings of the switches 50 and 51 are controlled at each cycle of the microcontroller 10, as a function of a difference between the expected current strength and the actual current strength, it is observed that the device applies a mean voltage to the load which is a sinusoidal voltage offset towards the zero voltage.

Since the present device does not change the state of the switches 50 and 51 unless necessary, and does not produce such changes other than at chosen intervals, the device produces the lowest voltage out of those compatible with the obtaining of the desired current strength.

Figure 5:
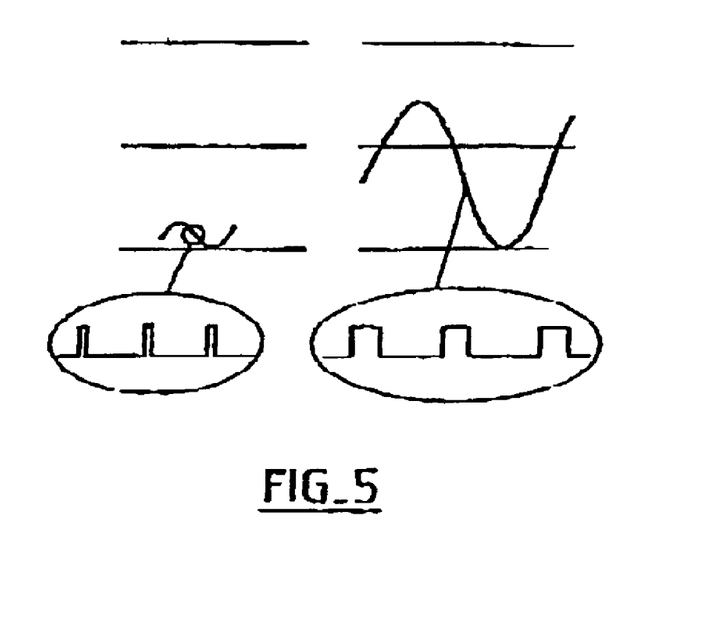
FIG. 5 represents voltage signals obtained with a circuit according to the invention on a load.

A sinusoid which at its minimum is tangential to the zero voltage is therefore observed here, as represented in FIG. 5.

Therefore, the voltage curve can be offset along the ordinate on account of the fact that this voltage is created by switchings each of which is actually necessary and is not predetermined with reference to a centered duty ratio.

The point of inflection of this sinusoid increases as the amplitude is increased, until it reaches the mean voltage V/2 when the amplitude of this sinusoid reaches the maximum value V/2, this being made possible here by the fact that the switchings of the transistors 50 and 51 are hardly inconvenienced by the idle times, these idle times occurring only at switchings, which here are rendered as infrequent as possible (switching only in response to a discrepancy with the reference signal).

Thus, the customary amplitude limitations are avoided through the fact that the idle times are avoided to the maximum extent, the switchings being reduced solely to the switchings required for the desired accuracy.

By virtue of the offset in ordinate towards the low voltages, the switches situated between the DC voltage source and the load are far more often open than closed, and are therefore less frequently traversed by a current, so that they heat up less. More broadly, the offsetting of the voltages towards the low end makes it possible to obtain better energy efficiency.

The circuit of FIG. 6 furthermore exhibits, between each output of the microcontroller 10 for the control of a switch, and the associated switch, a control damping circuit 80, also referred to hereinafter as the monitoring and isolation circuit.

The transistors used here are IGBTs (Insulated Gate Bipolar Transistors) whose control terminal behaves like a capacitor.

The control voltage of an IGBT transistor is applied between its gate and its emitter. Since the potential of the emitter can be floating, this voltage generally originates from an isolated supply and the control involves a purpose built circuit comprising an optocoupler and a driver (control unit).

Figure 11:
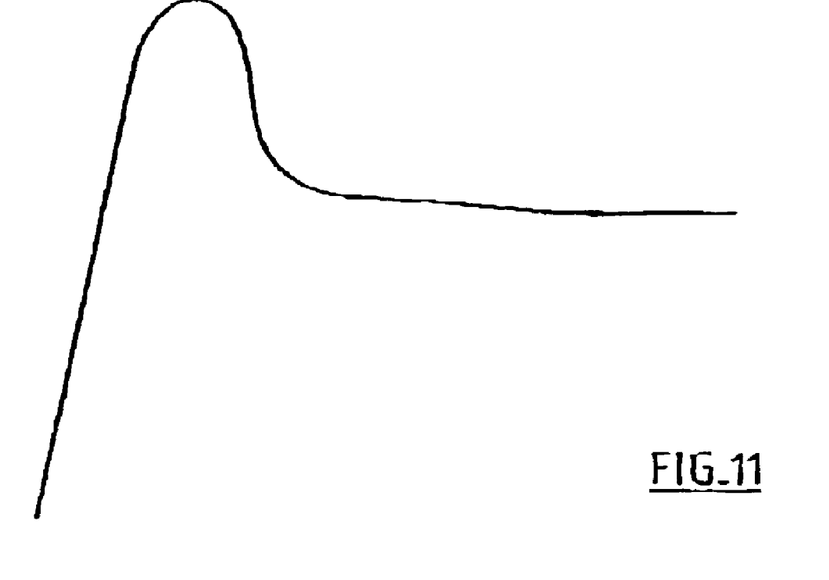
FIG. 11 represents a transistor control curve according to the prior art.

Represented in FIG. 11 is the profile of the voltage across the terminals of an IGBT transistor when the control voltage drops abruptly. The occurrence of an overvoltage can be clearly seen.

To avoid the heating up of the transistor when it is used for switching, it must be made to change state rapidly although with a speed limitation in the turn-off direction so as to avoid overvoltage.

A simple method consists in interposing a resistor between the driver and the gate of the IGBT transistor. This method has the defect of increasing the switching time in the opening direction and also in the closing direction.

Figure 9:
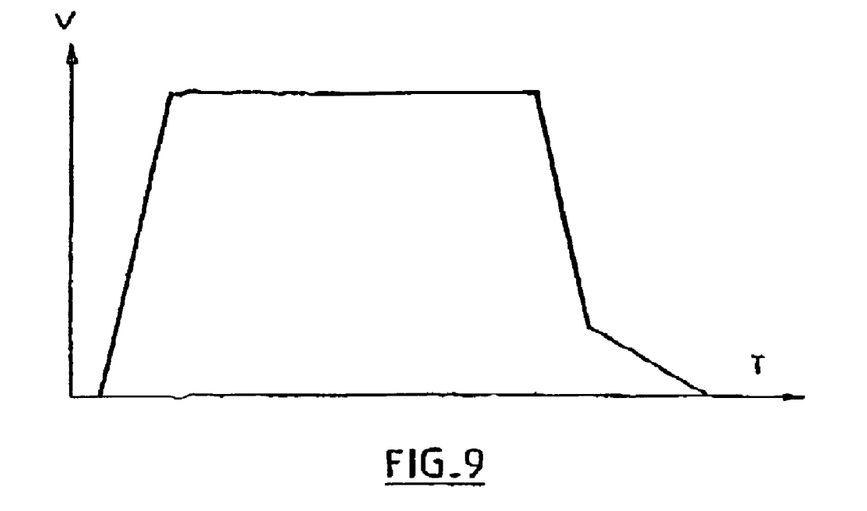
FIG. 9 represents an ideal shape of control voltage for an IGBT transistor.

The ideal control voltage for an IGBT transistor used for switching is represented in the curve of FIG. 9.

The rising slope is very steep, a first steep falling slope causes the control voltage to drop to a level where the transistor becomes resistive, a second gentler falling slope turns off the transistor progressively so as to limit the overvoltage. Assemblages of transistors for obtaining these three slopes have been proposed but this solution is complex.

Figure 10:
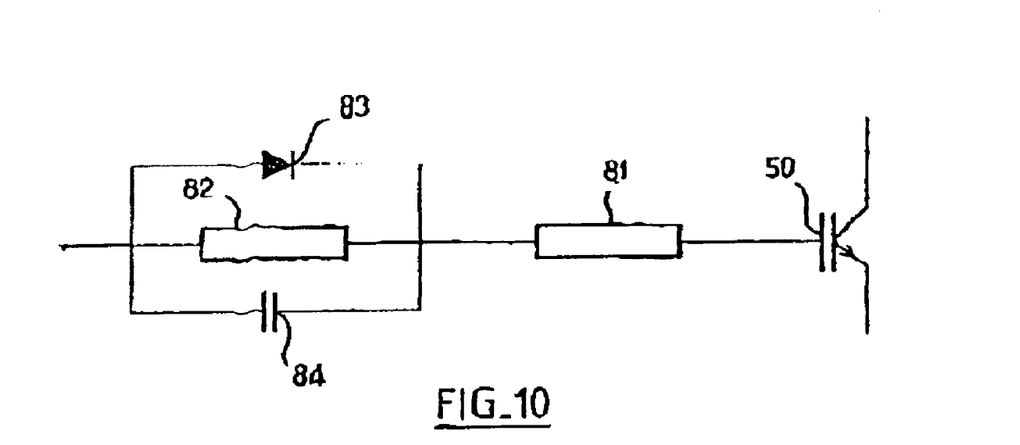
FIG. 10 represents a shaping circuit according to the invention.

In the invention these three slopes are achieved by a reliable and inexpensive circuit 80 comprising two resistors 81 and 82, a diode 83 and a capacitor 84, represented in FIG. 10.

This circuit exhibits, from the control output of the microcontroller to the control terminal of the transistor, here the transistor 50, firstly three parallel branches carrying respectively the resistor 82, the diode 83 arranged so as to be passing from the microcontroller 10 to the transistor 50, and the capacitor 84. After these three parallel branches there is a resistor 81 linked in series to the transistor 50.

The diode 83 short-circuits the resistor 82 during the rise, the slope of which is fixed by the resistor 81, hence a steep slope.

At the commencement of the tall the capacitor 84 causes the voltage on the gate of the transistor 50 to drop steeply and then the electric charge is removed slowly across the resistor 82 which fixes the slope of the end of the curve, the diode 83 being off.

The position of the point of inflection is fixed by the ratio of the capacitance of the gate of the transistor 50 to that of the capacitor 84. The curve obtained is close to the ideal and it has been possible experimentally to obtain shorter switching times than those usually encountered without appreciable overvoltage.

It will be noted that here the IGBT transistors 50 and 51 each include a parallel free wheel diode.

Figure 8:
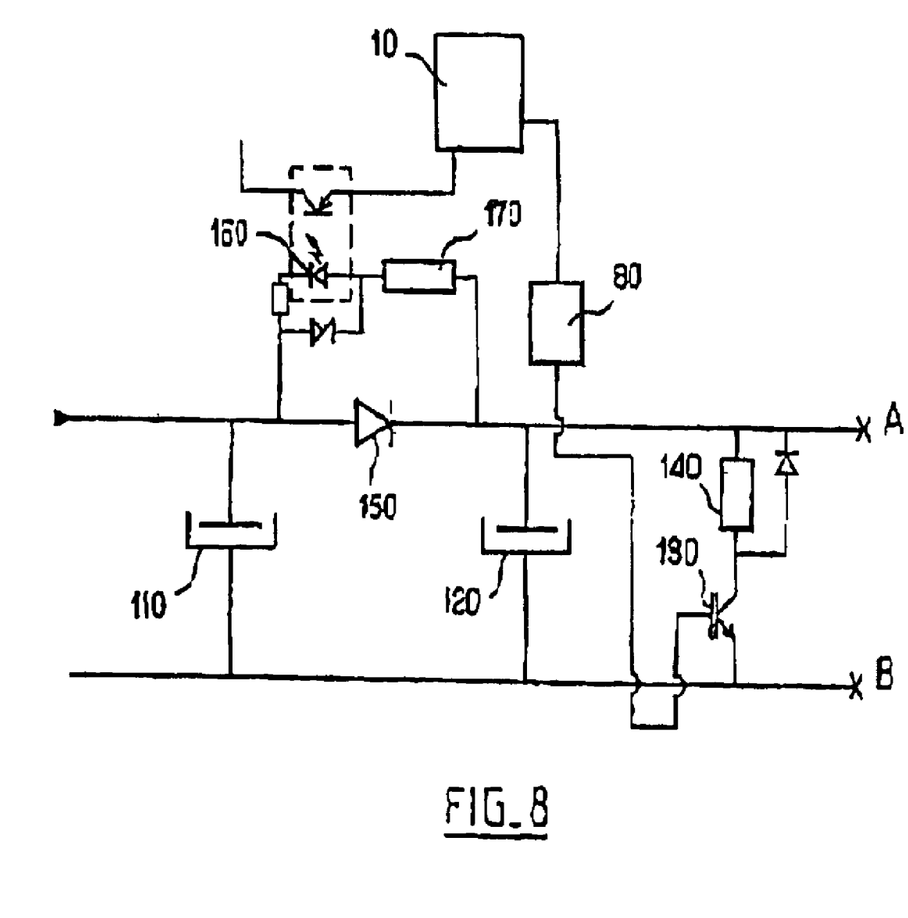
FIG. 8 represents a circuit for elimination of electrical energy produced by an asynchronous motor placed at the output of the circuit of the circuit of FIG. 6 in a mode of breaking of this motor.

The circuit represented in FIG. 8 is also located between the DC line at the voltage V and earth, here between two terminals A and B.

This circuit exhibits four terminals, of which two terminals which are downstream with respect to the direction of supply are connected to the terminals A and B represented in FIG. 8, that is to say respectively to the positive terminal A of each of the switches 50 for linking with the DC line, and to earth B.

The other two terminals C and D of this circuit are connected, at the upstream part of this circuit, to the DC voltage source and to earth (the DC voltage source may for example be a rectifier arranged on a three-phase supply network).

This circuit comprises three branches intended to be placed parallel to the switching branches carrying the switches 50 and 51.

Two of these three branches carry respectively a capacitor 110 and 120, the third branch carrying in series a transistor 130 and a resistor 140.

Two corresponding terminals of the two branches carrying the capacitors 110 and 120 are linked by a diode 150 arranged so as to be passing in the direction going from the source to the switching branches.

Those two terminals of the two branches are also linked, in parallel with the diode 150, by a branch carrying in series a light-emitting diode 160 and a resistor 170.

This diode 160 is itself arranged so as to be passing in the direction going from the switching branches to the DC voltage source.

A zener diode for protecting this light-emitting diode 160 is placed in parallel with the latter, to which it is linked on the source side by a resistor. This last resistor limits the current in the zener diode. An additional capacitor can be placed across the terminals of the zener diode to improve the efficacy to transient voltages.

By virtue of this circuit, when the electric motor is in brake mode, stated otherwise when it is generating, delivering a current strength to the source, the diode 150 turns off and a current going back up towards the source is set up in the light-emitting diode 160, corresponding to changes of load of the two capacitors 110 and 120. The diode 160 then lights up.

Here, this diode is a diode optocoupled to the microcontroller 10 which, in response to the lighting up of the diode 160, closes the transistor 130 linking the positive terminals of the switching branches to earth by causing the current to pass through a resistor 140.

This resistor 140 then eliminates through the joule effect the energy delivered by the motor. The fact that this elimination branch switch 130 is controlled by the microcontroller 10 allows the duration of closure thereof to be monitored. Thus, the microcontroller, on detecting the brake mode, closes the switch 130 for a duration which oversteps the instant at which the current reverts to the direction going from the source to the motor.

This avoids switching of the transistor 130 at overly large frequency in the case of frequent changes of direction, which would quickly damage it.

Advantageously, the microcontrollor 10 comprises on its control output linked to the transistor 130, between this output and this transistor, a damping circuit 80 similar to the circuits 80 placed between the microcontroller 10 and the switches 50, 51 for supplying the load 74.

Furthermore, the resistor 140 is advantageously placed on the source side with respect to the switch 130, and a free wheel diode is advantageously placed in parallel with the resistor 140, arranged so as to be passing from the terminal of this resistor 140 which is furthest from the positive voltage supply terminal to the terminal at the DC supply voltage.

This circuit constitutes a frequency converter forming a three-phase generator with which variations in rotor resistance have no effect on the motor torque. The rotation is regular even for frequencies as low as 0.25 Hz. The voltage of the DC bus has no effect other than on the maximum frequency.

The present invention allows the production of a periodic signal generator which is cheap since it requires no computer and which is flexible with built-in, hence simple, external quantity-based automatic control.

The periodic signal to be generated is stored in an internal table inside a microcontroller. The periodic signal extracted at a regular interval proportional to the desired frequency is sent to a digital/analog converter by the microcontroller.

The analog voltage arising from this converter is applied to an input of a comparator. The second input of this comparator is linked to a device for measuring the signal generated. The microcontroller reads the result of the comparison and triggers or maintains the switching if the measured signal is less than that expected. When the signal is greater the microcontroller stops the switching or keeps it inactive. The switching is therefore at variable frequency and pulse width. It is automatically controlled by the signal obtained. The behavioral corrections are automatic.

The circuits described above are advantageously used to energize an inductive loop, constituting with this inductive loop a contactless energy source. A device furnished with means for transforming magnetic field variations into a supply current then taps off this energy, without contact. The above circuits are advantageous for such an application in that they allow easily implementable automatic current control, which proves to be especially advantageous in these applications.

According to variants, the low-voltage supplies of the monitoring circuits, microcontroller, comparators for example, are obtained directly or indirectly by chopping the main DC voltage.

According to other applications of the circuits described above, they may be used to energize a motor for winding up long products such as cables or to energize a motor brake of the type with low-voltage DC current supply, this brake being supplied by chopping the main DC voltage.

Figure 12:
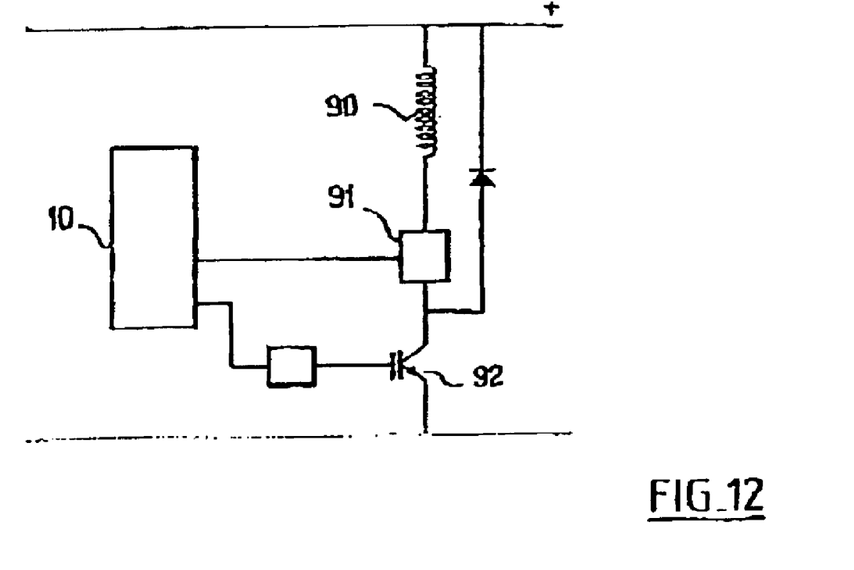
FIG. 12 a motor braking circuit according to the invention.

Represented in FIG. 12 is a circuit arrangement for such a brake. Such a brake is composed of a brake coil 90, arranged between the DC voltage source and earth, on a branch carrying in series this coil 90, a current sensor 91 and a control transistor 92. The current sensor 91 provides the microcontroller 10 with a signal indicative of the value of the current passing through the coil 90, and the microcontroller 10 controls the switchings of the transistor 92 in such a way as to obtain the desired current in the coil 90. Such a circuit is advantageously associated with the circuit of FIG. 6 so as to brake the motor 74 in particular when there is an interruption or a drop in the voltage of the DC source. It will also be noted that this circuit includes a free wheel diode extending from a point situated downstream of the coil and returning to the DC voltage source, thus forming a loop which encompasses the coil 90 and the sensor 91.

This circuit thus allows the monitoring of wind-up upon the removal of the network voltage. In the case of an electric cable winder this makes it possible to protect the cable during this type of incident.

Monitoring may thus be retained down to a voltage as low as 100 V.

A device for identifying products, which was described previously in the case of the energizing of an inductive loop, can also be produced by associating a generator according to the invention with a load including two capacitive plates.

A generator according to the invention is also advantageously used to cause the passage of a predetermined amount of charge for deposition by electroplating, or else for the charging of batteries.

The generator is advantageously used whenever one of the two electrical quantities, current strength or voltage, has to be automatically controlled and measurement of the second affords useful information for the right end of the process for example battery charging, electrochemical depositions, and especially under DC current.

The generator is advantageously used whenever one of the three electrical quantities, current strength or voltage of frequency, must be automatically controlled and when the measurement of one or other of the quantities affords useful information for the right end of the process under periodic current, for example for identifying metals.

Figure 13:
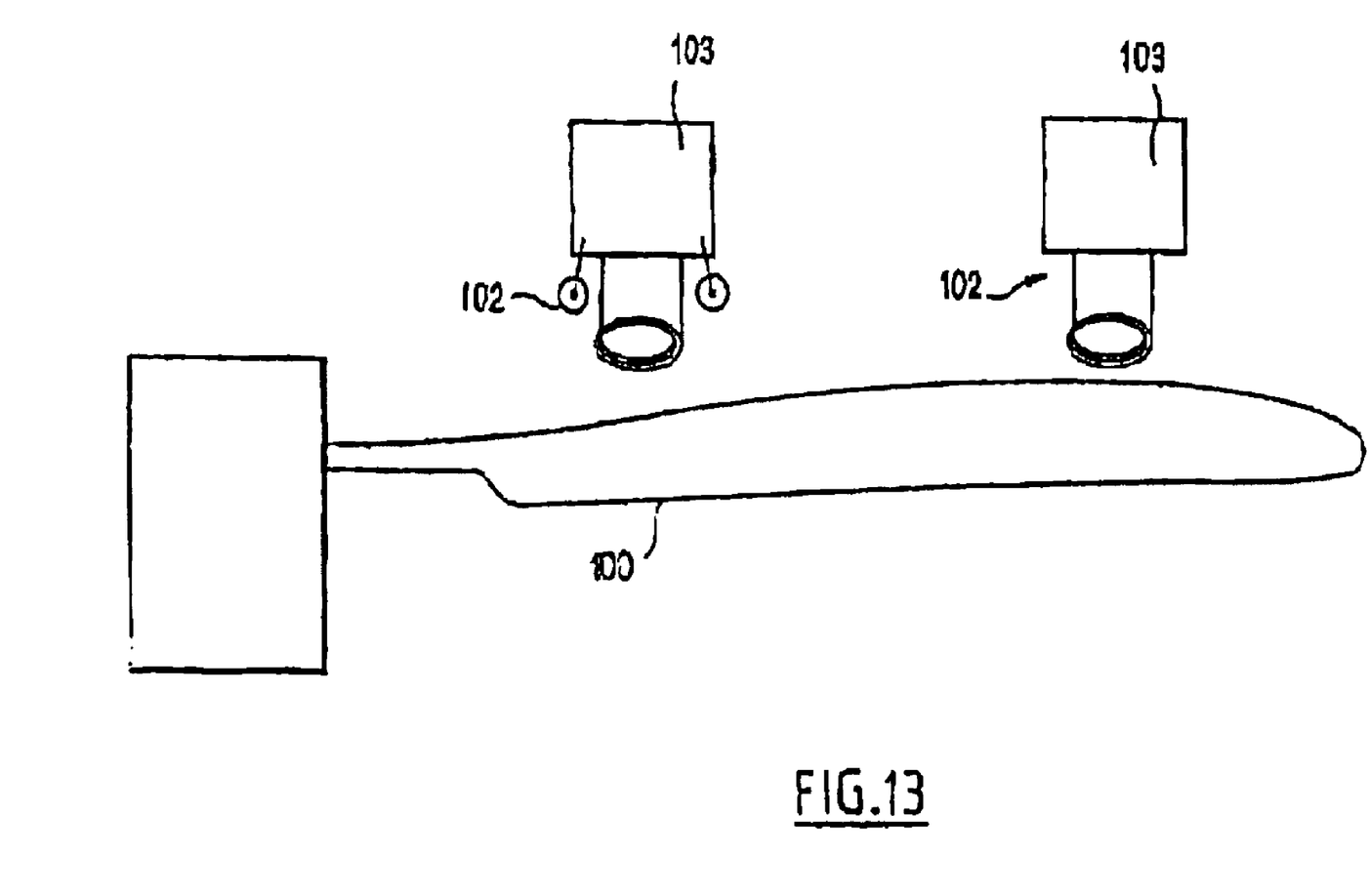
FIG. 13 represents a contactless generator according to the invention.

According to a variant represented in FIG. 13, the generator energizes an inductive coil 100 of elongate shape intended to be coupled not its electromagnetic fields with one or more receivers 102 secured to mobiles 103 moving parallel to the inductive loop 100 in its length direction.

What is claimed is:

1. A signal generator comprising:
    a generator means for producing at least one reference signal;
    a logic computer,
    at least one chopping switch,
    at least one sensor for extracting at least one signal generated in response to the switchings of said at least one switch,
    means for making a comparison between said at least one extracted signal and at least one reference signal,
    wherein the logic computer forms a means of control for controlling said at least one switch and designed to deliver on said at least one switch one or more control levels which is or are dependent on the result or results of this comparison or these comparison(s),
    wherein the means for making a comparison comprising at least one comparator(s) making said comparisons,
    the logic computer comprising one or more inputs receiving a result of the comparison or comparisons, from said at least one comparator, and
    the logic computer being programmed so as to update the control level(s) delivered to the chopping switch as a function of the comparison result(s) received, according to a programmable update frequency wherein the programmable update frequency is independent from the results of the comparison which are received on said inputs of the logic computer.

2. The signal generator as claimed in claim 1, wherein the logic computer is programmed to update the control level(s) delivered at regular time intervals.

3. The signal generator as claimed in claim 1 wherein the logic computer includes a clock, means for triggering the updates of the state of a switch at instants indexed with regard to this clock, the computer further including means for delivering a series of reference values, successively as the reference signal wherein the means for successively delivering the reference values are programmed so as to go from one reference value to another in a manner indexed with regard to the same clock as that with regard to which the updates of the state of the switch are indexed.

4. The signal generator as claimed in claim 1 wherein the logic computer includes means for delivering a series of reference values successively as the reference signal and wherein said means are designed to deliver a value at regular time intervals.

5. The signal generator as claimed in claim 1, wherein the logic computer includes means for regularly delivering a reference value on an output of the computer, in such a way as to form a reference signal, said means being able to deliver one and the same value several times in succession, the logic computer further including means for triggering a transition from one value to a next value as reference value to be delivered, these last means being designed to trigger such a transition more or less frequently as a function of a value received on an input frequency.

6. The signal generator as claimed in claim 1, wherein the logic computer comprises means for counting the number of occurrences of a given state of the switch during a given time interval.

7. The signal generator as claimed in claim 6, wherein the computer comprises means for counting a number of occurrences of a given state of the switch which have arisen over a period corresponding to the presence of a predetermined part of the reference signal.

8. The signal generator as claimed in claim 1 wherein the logic computer comprises means for determining a time interval during which there is a given number of occurrences of a given state of the switch.

9. The signal generator device in claim 1, further comprising an inductive loop connected at the output of the signal generator and adapted to supply under variable magnetic fields a device furnished with means for generating current in response to the variable magnetic field.

10. The signal generator device as claimed in claim 9 wherein the inductive loop of elongate shape adapted to be coupled to its electromagnetic fields with one or more receivers secured to mobiles moving parallel to the inductive loop in its length direction.

11. The device claimed in claim 1, further comprising: supply means for energizing an inductive loop and means of detection of variation of inductance across the terminals of the loop in response to the presence of objects in front of this loop so that the device forms a device for detecting the presence of objects of a chosen type near the inductive loop.

12. A signal generator comprising:
a logic computer,
at least one chopping switch,
at least one sensor for extracting at least one signal generated in response to the switchings of said at least one switch,
means for making a comparison between said at least one extracted signal and at least one reference signal,
wherein the logic computer forms a means of control for controlling said at least one switch and designed to deliver on said at least one switch one or more control levels which is or are dependent on the result or results of this comparison or these comparison(s),
wherein the means for making a comparison comprising at least one comparator(s) making said comparisons,
the logic computer comprising one or more inputs receiving a result of the comparison or comparisons, from said at least one comparator,
the logic computer being programmed so as to update the control level(s) delivered to the chopping switch as a function of the comparison result(s) received according to a programmable update frequency wherein the programmable update frequency is independent from the results of the comparison which are received on said inputs of the logic computer; and
wherein the logic computer includes means for regularly delivering a reference value on an output of the computer in such a way as to form a reference signal, a clock, a bit series over which is stored a digital value, means for incrementing this digital value in a regular manner indexed with regard to the clock, and means for determining the increment to be applied regularly as a function of a value received on an input of the logic computer, the computer further comprising means for triggering the transition from a reference value to a next reference value as reference value to be delivered whenever a predetermined bit of the bit series changes state.

13. The signal generator as claimed in claim 12, comprising at the output of the logic computer, at least one digital/analog converter and, at the output of this converter, a comparator for receiving on its first input the output signal from this converter, and on its second input the extracted signal.

14. The signal generator as claimed in claim 13 comprising one respective switch controlled by the logic computer, and at least one comparator between a reference signal and a signal extracted from a relevant branch, the result of the comparison being used by the logic computer to control the state of the switch of the relevant branch.

15. The signal generator as claimed in claim 14, comprising means for generating on said at least one comparator a signal having the form of a series of alternating intervals which correspond to several reference signals each corresponding to a branch wherein the logic computer is designed to disregard, for the control of a relevant branch, the result of the comparison except for time intervals where the comparator receives an interval of a reference signal corresponding to this branch.

16. A signal generator, comprising:
a logic computer,
at least one chopping switch,
at least one sensor for extracting at least one signal generated in response to the switchings of said at least one switch,
means for making a comparison between said at least one extracted signal and at least one reference signal,
wherein the logic computer forms a means of control for controlling said at least one switch and designed to deliver on said at least one switch one or more control levels which is or are dependent on the result or results of this comparison or these comparison(s),
wherein the means for making a comparison comprising at least one comparator(s) making said comparisons,
the logic computer comprising one or more inputs receiving a result of the comparison or comparisons, from said at least one comparator,
the logic computer being programmed so as to update the control level(s) delivered as a function of the comparison result(s) received according to a cycle frequency which cycle frequency is independent from the results of the comparison which are received on said inputs of the logic computer;
wherein the logic computer includes means for regularly delivering a reference value on an output of the computer in such a way as to form a reference signal, a clock, a bit series over which is stored a digital value, means for incrementing this digital value in a regular manner indexed with regard to the clock, and means for determining the increment to be applied regularly as a function of a value received on an input of the logic computer, the computer further comprising means for triggering the transition from a reference value to a next reference value as reference value to be delivered whenever a predetermined bit of the bit series changes state;

at the output of the logic computer, at least one digital/analog converter and, at the output of this converter, a comparator for receiving on its first input the output signal from this converter, and on its second input the extracted signal; and two digital/analog converters placed at the output of the logic computer, one of which receives from, the logic computer a digital value defining a reference curve amplitude, and the other of which receives from the logic computer a succession of points defining a reference curve shape, said other digital/analog converter also receiving from the first converter the value of the amplitude, which it applies to the curve before transmitting it to a comparator.

17. A signal generator comprising:

a logic computer, at least one chopping switch, at least one sensor for extracting at least one signal generated in response to the switchings of said at least one switch, means for making a comparison between said at least one extracted signal and at least one reference signal, wherein the logic computer forms a means of control for controlling said at least one switch and designed to deliver on said at least one switch one or more control levels which is or are dependent on the result or results of this comparison or these comparison(s), wherein the means for making a comparison comprising at least one comparator(s) making said comparisons, the logic computer comprising one or more inputs receiving a result of the comparison or comparisons, from said at least one comparator, the logic computer being programmed so as to update the control level(s) delivered as a function of the comparison result(s) received according to a cycle frequency which cycle frequency is independent from the results of the comparison which are received on said inputs of the logic computer;

wherein the logic computer includes means for regularly delivering a reference value on an output of the computer in such a way as to form a reference signal, a clock, a bit series over which is stored a digital value, means for incrementing this digital value in a regular manner indexed with regard to the clock, and means for determining the increment to be applied regularly as a function of a value received on an input of the logic computer, the computer further comprising means for triggering the transition from a reference value to a next reference value as reference value to be delivered whenever a predetermined bit of the bit series changes state;

at the output of the logic computer, at least one digital/analog converter and, at the output of this converter, a comparator for receiving on its first input the output signal from this converter, and on its second input the extracted signal;

one respective switch controlled by the logic computer, and at least one comparator between a reference signal and a signal extracted from a relevant branch, the result of the comparison being used by the logic computer to control the state of the switch of the relevant branch;

means for generating on said at least one comparator a signal having the form of a series of alternating intervals which correspond to several reference signals each corresponding to a branch wherein the logic computer is designed to disregard, for the control of a relevant branch, the result of the comparison except for time intervals where the comparator receives an interval of a reference signal corresponding to this branch; and wherein the extracted signal and the reference signal each represent a respective quantity from the voltage and the current strength in a load placed at the output of the signal generator, the signal generator further comprising means for providing, as a function of the number of occurrences counted during a given time interval of a given state of the switch, or of the measured time interval required for a given number of occurrences of a given state of the switch, an indication of a detection of the distortions between the current strength or the voltage switch by the switch and respectively the reference voltage or current strength.

18. A signal generator comprising:

a logic computer, at least one chopping switch, at least one sensor for extracting at least one signal generated in response to the switchings of said at least one switch, means for making a comparison between said at least one extracted signal and at least one reference signal, wherein the logic computer forms a means of control for controlling said at least one switch and designed to deliver on said at least one switch one or more control levels which is or are dependent on the result or results of this comparison or these comparison(s), wherein the means for making a comparison comprising at least one comparator(s) making said comparisons, the logic computer comprising one or more inputs receiving a result of the comparison or comparisons, from said at least one comparator, the logic computer being programmed so as to update the control level(s) delivered to the chopping switch as a function of the comparison result(s) received, according to a dynamic updating frequency wherein the dynamic updating frequency is independent from the results of the comparison which are received on said inputs of the logic computer, and wherein the switch is designed to be placed in an intermediate manner between a voltage source and the earth, and intended to be associated with a first load between this voltage source and the earth, the signal generator further comprising an additional switch between the source and the earth and associated with a dissipation load, as well as a current sensor comprising a diode placed so as to detect an outgoing current leaving said first load and contrary to that generated by the signal generator, and means for triggering a switching of the additional switch upon the detection of such a contrary current in such a way as to cause a current to flow in the dissipation load, these means of detection and of triggering including a logic computer.

19. The signal generator as claimed in claim 18, wherein the means for detecting said contrary current include a current sensor which is an optocoupling diode coupled with the logic computer.

20. The signal generator as claimed in claim 18 wherein the triggering means is the logic computer which is designed to generate the reference curve.

21. The signal generator as claimed in claim 18 further comprising a first diode arranged so as to be passing from a voltage source to the supply switch wherein the current sensor is an emitter diode placed in parallel with this first diode in the direction going from the supply switch to the source.

22. The signal generator as claimed in claim 18, further comprising a diode arranged so as to be passing from the source to the switch and two capacitors each having a first terminal linked to a respective terminal of the diode and a second terminal linked to earth.

23. A supply signal generator device comprising:
an electric motor; and
a signal generator comprising:
a logic computer,
at least one chopping switch,
at least one sensor for extracting at least one signal generated in response to the switchings of said at least one switch,
means for making a comparison between said at least one extracted signal and at least one reference signal,
wherein the logic computer forms a means of control for controlling said at least one switch and designed to deliver on said at least one switch one or more control levels which is or are dependent on the result or results of this comparison or these comparison(s),
wherein the means for making a comparison comprising at least one comparator(s) making said comparisons,
the logic computer comprising one or more inputs receiving a result of the comparison or comparisons, from said at least one comparator,
the logic computer being programmed so as to update the control level(s) delivered to the chopping switch as a function of the comparison result(s) received according to a programmable update frequency wherein the programmable update frequency is independent from the results of the comparison which are received on said inputs of the logic computer; and
wherein the reference signal is based on discrete predetermined reference values that are successively stepped over variable time periods based on user inputs configured to energize this motor.

24. The device claimed in claim 23 further comprising a device for winding up long products by operatively controlling the electric motor.

25. A supply signal generator device comprising:
an electric motor; and
a signal generator comprising:
a logic computer,
at least one chopping switch,
at least one sensor for extracting at least one signal generated in response to the switchings of said at least one switch,
means for making a comparison between said at least one extracted signal and at least one reference signal,
wherein the logic computer forms a means of control for controlling said at least one switch and designed to deliver on said at least one switch one or more control levels which is or are dependent on the result or results of this comparison or these comparison(s),
wherein the means for making a comparison comprising at least one comparator(s) making said comparisons,
the logic computer comprising one or more inputs receiving a result of the comparison or comparisons, from said at least one comparator,
the logic computer being programmed so as to update the control level(s) delivered as a function of the comparison result(s) received according to a cycle frequency which cycle frequency is independent from the results of the comparison which are received on said inputs of the logic computer;
wherein the reference signal is based on discrete predetermined reference values that are successively stepped over variable time periods based on user inputs configured to energize this motor; and
means of inductive braking of the motor, wherein the logic computer is designed to control this means of braking with the aid of said at least one signal generated in response to the switchings of said at least one switch.

26. The device as claimed in claim 25 wherein said at least one sensor is a current measuring device.

27. The device as claimed in claim 25 wherein the logic computer includes means for deducing from a number of occurrences of the activated state in a given time interval or from a time interval required for a given number of occurrences of an activated state of the inductive brake, the proper functioning of this brake, and for delivering a signal indicative of this proper functioning.

28. The device in claim 25 wherein, the inductive braking means comprises an inductive element energized by the signal.

* * * * *